United States Patent [19]

Svala

[11] 4,159,644

[45] Jul. 3, 1979

[54] SHIP'S LOG AND SPEEDOMETER

[76] Inventor: Carl G. Svala, 79 William St., Norwalk, Conn. 06851

[21] Appl. No.: 906,075

[22] Filed: May 15, 1978

[51] Int. Cl.² .............................................. G01C 21/10
[52] U.S. Cl. ....................................... 73/187; 324/167
[58] Field of Search ................. 73/187, 189, 228, 229, 73/231 R, 231 M; 324/167

[56] References Cited

U.S. PATENT DOCUMENTS

| | | | |
|---|---|---|---|
| 3,287,969 | 11/1966 | Hardy | 73/187 |
| 3,636,767 | 1/1972 | Duffy | 73/229 |

FOREIGN PATENT DOCUMENTS 758755 10/1956 United Kingdom ..................... 73/187

Primary Examiner—Donald O. Woodiel
Attorney, Agent, or Firm—Charles M. Hutchins

[57] ABSTRACT

My invention relates to ship'logs and speedometers, comprising magnetometers and associated circuitry located inside the hull of the vessel, for accurately sensing, indicating, and recording the revolutions of an external rotator equipped with a small permanent magnet assembly. The rotator with a low-friction bearing arrangement is suitably located outside and below the hull of the vessel so that its rotation accurately registers the movement of the vessel through the water. The elimination of any mechanical or electrical connection between the rotator and the inside sensing components of the magnetometer assembly facilitates removal of the rotator for maintenance and substantially reduces the risk of leaks through the hull of the vessel.

15 Claims, 9 Drawing Figures

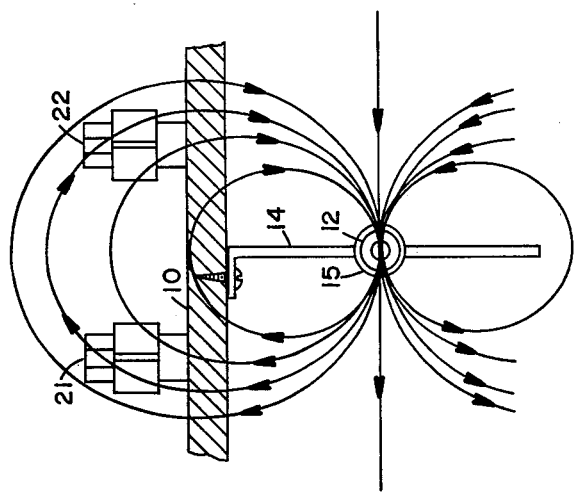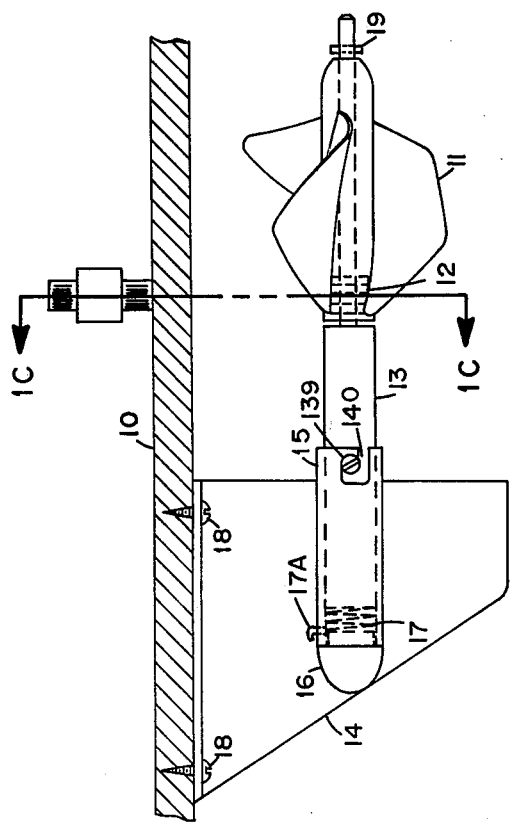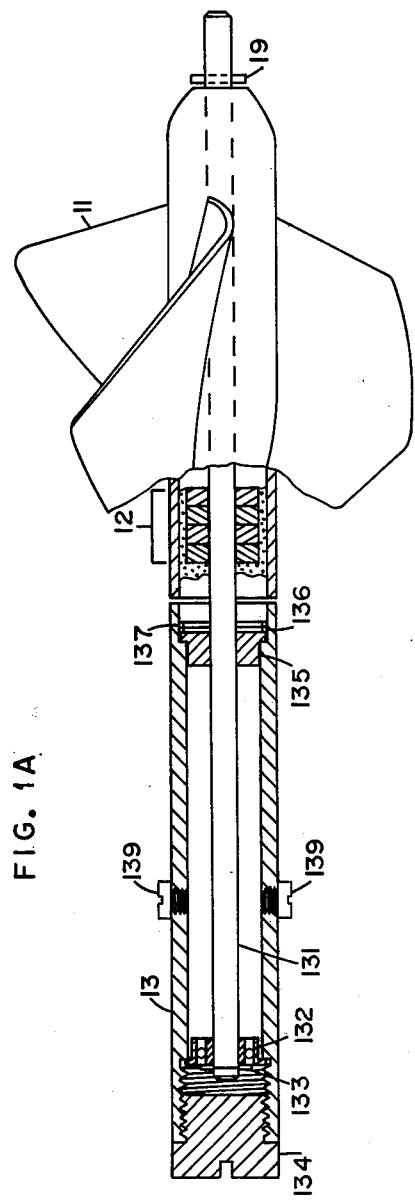

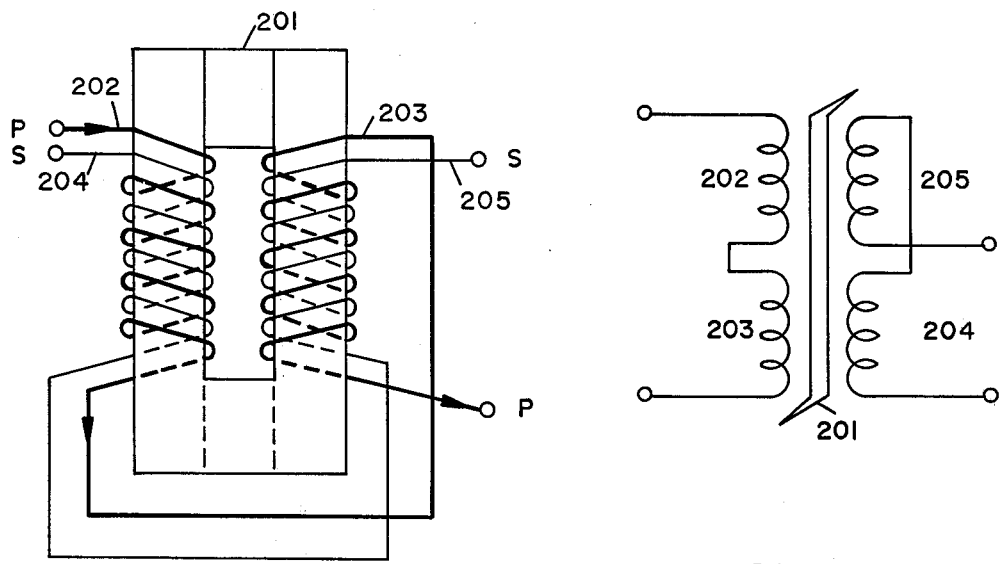
FIG. 2A
21 OR 22
FIG. 2B
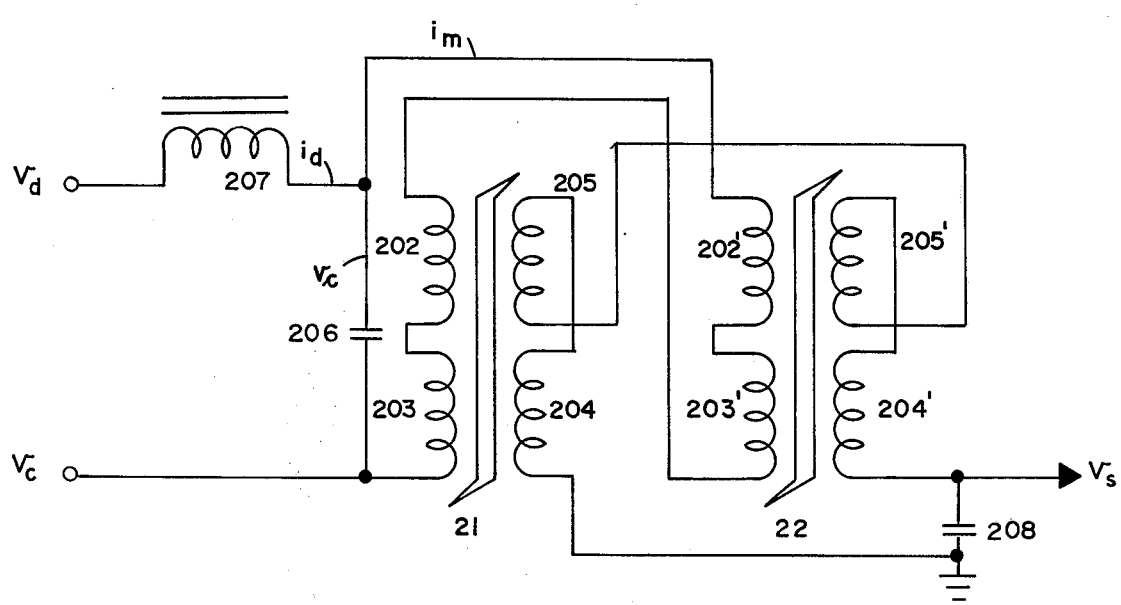
FIG. 2C

SHIP'S LOG AND SPEEDOMETER

SUMMARY OF THE INVENTION

A first objective of the invention is to provide an improved log system for accurate measurement of the distance traveled by small- and medium-size vessels such as pleasure craft, fishing vessels, and the like. For such boats, where for practical and economic reasons more complex navigational aids such as radar, loran, etc., cannot be provided, an accurate and reliable ship's log which can be built at a moderate price is a key accessory, essential for safe navigation, especially at reduced visibility.

A second objective of the invention is to provide an improved ship's speedometer giving a continuous indication of speed, optionally with expanded scale, thus facilitating optium adjustment of trim or sails in order to maximize speed or fuel economy.

Whereas the invention is well suited to satisfy either of these two objectives, a combination of both can be provided at low additional cost. In this context, it should be recognized that, from an accuracy point of view, the first objective is the most important one and once it is satisfied, the indication of speed is of value mainly with regard to speed variations. Absolute speed accuracy is somewhat less important. Accordingly, in the following description and discussion of the invention, emphasis is laid upon the accurate measurement and registration of distance travelled through the water, i.e. the log function.

A simple, reliable, and fairly accurate log is the classical patent log which consists of a screw-shaped rotator attached to the end of a line suspended in the wake of the vessel. The revolutions of the rotator are transmitted via the line to a simple mechanical counter to which the line is attached. The main advantage of the patent log is its simplicity and the fact that it can easily be taken on board for cleaning if it has been fouled. This feature is also associated with its main disadvantage, namely, that it must be taken on board before docking or reversing and that, even when the boat is underway, it may interfere with the movements of other vessels.

Many of these problems have been eliminated with a popular log marketed under the trademark "SUMLOG" by VDO Marine Instruments, 980 Brooke Road, Winchester, Va. 22601. This instrument operates on a similar principle in that it relies on a rotator similar to the one used on the patent log. The rotator is, however, mounted on a shaft extended horizontally from a small gear-housing mounted on the bottom of the hull. A secondary shaft, to which the first mentioned shaft is geared, traverses the hull inside a fitting which is part of the gear-housing. A flexible cable connects the secondary shaft to an indicating mechanism. This is of the same general type as used on automobiles and indicates both speed and distance, including a resettable trip meter. Although a great improvement over the patent log, the "SUMLOG" still has the following disadvantages: friction caused by the gear mechanism and the flexible shaft, the need for a hole through the hull and associated potential leakage problems. Further, it is very difficult to remove this rotator and gear mechanism for cleaning and maintenance while the vessel is in the water. A modified version of the "SUMLOG," in which an electrical sending unit replaces the flexible shaft, reduces error caused by friction in the flexible shaft but the other disadvantages remain.

Other log designs exist which minimize the friction error by sensing the magnetic field from a permanent magnet imbedded in a paddle-wheel arranged so that the paddles protrude from the bottom of the hull of the vessel. This arrangement, however, requires a sizable hole in the hull for mounting the paddle-wheel. Even though this type of mounting may include provision for retracting the paddle-wheel through a tube for cleaning and service, the need for a large hole in the hull is a distinct disadvantage from a safety point of view. Removal or reallocation of the unit will necessitate hull repair.

The log according to my invention avoids the cited disadvantages, thanks to a unique feature: the remote sensing of the magnetic field from a permanent magnet imbedded in or attached to a rotator similar to the one used on the patent log or the "SUMLOG." "Remote" in this context means 3 inches or more, i.e. the sensing can take place inside the hull provided the hull material is non-magnetic and preferably non-conductive. This is not a serious limitation as most boats in the category of interest have hulls made of wood or fiberglass. With some reduction in sensitivity due to eddy currents, it is conceivable that the invention may be applied to vessels with aluminum hulls as well.

Remote magnetic sensing is not feasible with conventional means such as reed contacts (used in some of the paddle-wheel schemes) or pick-up coils, due to the rapid decay in magnetic field strength with distance from the source (the rotating permanent magnet). It could be argued that the induced EMF in a pick-up coil, although weak, could be amplified to the necessary level for detection. Remembering that the induced EMF will be proportional to speed, it must then be recognized that reliable detection at low speeds will be extremely difficult if not impossible to attain in the presence of any electrical (or magnetic) noise caused by other equipment in or adjacent to the vessel.

An important feature of the invention, which makes it practical to use magnetic sensing of the rotator motion through the hull, is the combination of two similar magnetometers so positioned that detection of the rotating magnetic field generated by the rotator is maximized, whereas the influence of other ambient magnetic fields, such as fields from engines or other magnetic bodies in the boat is minimized. Discrimination against unwanted signals is further enhanced by another feature of the invention, synchronous detection, for which a simple and efficient circuit is described, that takes advantage of standard integrated circuits.

Still another feature of the invention is the provision of a ferroresonant drive circuit for the magnetometers, resulting in high magnetometer sensitivity at a minimum of power consumption. This is a distinct advantage for applications where only battery power is available.

A further feature of the invention, made possible by the semi-remote sensing arrangement, is the possibility of mounting the rotator and its supporting bearing arrangement without the necessity of drilling any holes all the way through the hull.

Yet another feature of the invention is provision for easily removing the rotator, and optionally its bearing assembly, for maintenance while the boat is in the water.

Still another feature of the invention is the reduction of error caused by friction, in combination with consistent recording of the number of revolutions, thereby obviating the need for calibration of the log—provided the rotator is properly located below the hull. The low friction also contributes to very small errors at low speed.

DESCRIPTION OF THE INVENTION

The invention will now be described in detail with reference to a specific embodiment, which has been successfully tested, in conjunction with the following drawings:

FIG. 1A is a simplified side elevation view of certain elements of the invention, comprising a rotary sensing unit mounted below the hull of a vessel and a magnetic sensor assembly mounted inside the hull;

FIG. 1B is an enlarged longitudinal section view of the shaft and bearing assembly for the rotor of the unit of FIG. 1A;

FIG. 1C is a diagrammatic vertical cross-sectional view, along the line 1C—1C of FIG. 1A, showing the physical relationship of certain sensing components and magnetic flux lines for one orientation of the rotor;

FIG. 2A is a simplified side elevation view of a magnetic sensor of the flux-gate type that is suitable for use in the assembly of FIG. 1A;

FIG. 2B is a schematic diagram showing the electrical interconnections of the windings in the magnetic sensor of FIG. 2A;

FIG. 2C is a schematic diagram showing the two magnetic sensors of FIG. 1C and associated circuitry;

Figure 2D:
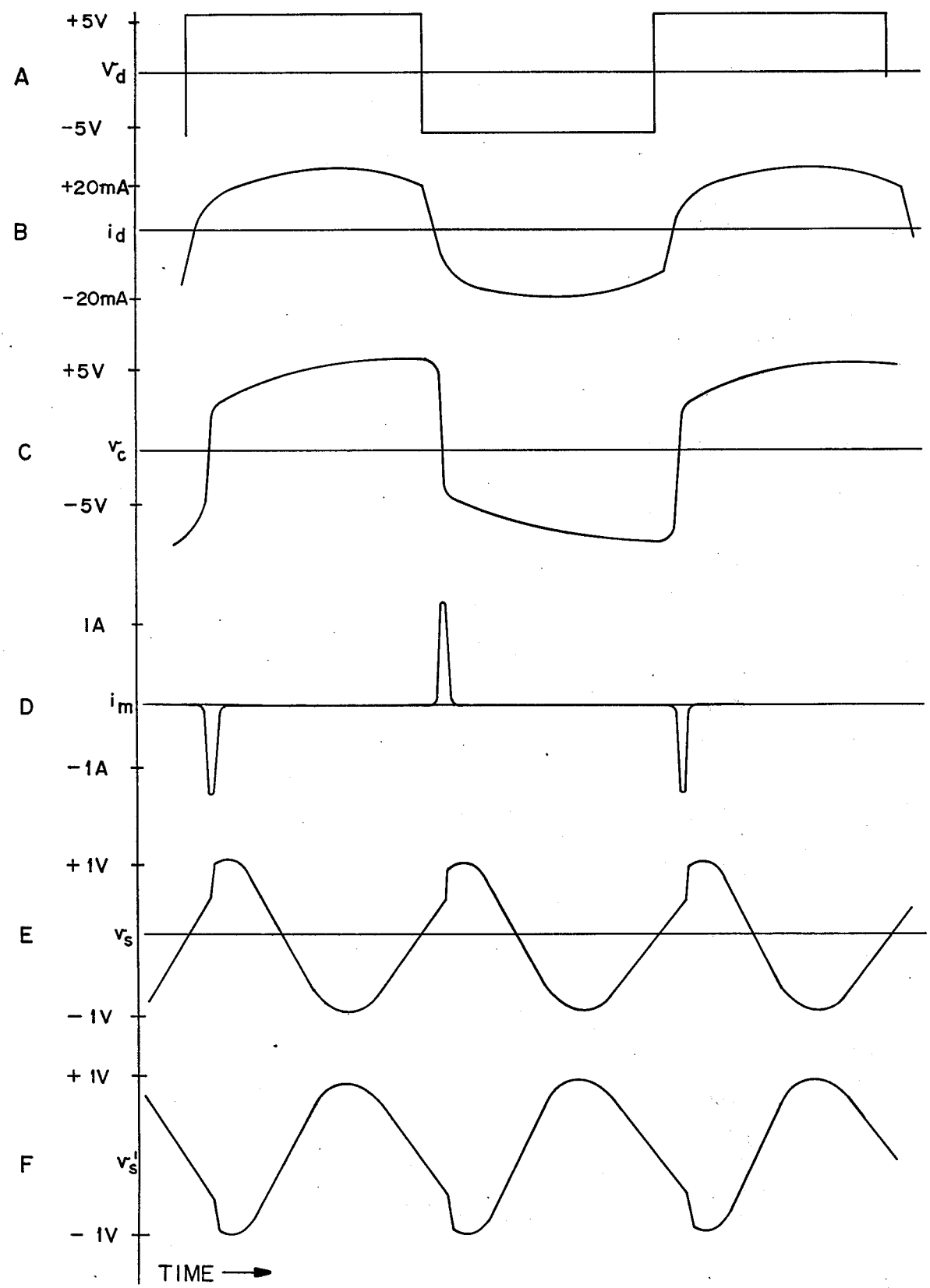
FIG. 2D is a set of waveforms showing how certain voltages and currents in the sensing system of FIG. 2C vary with time.

FIG. 1A shows the complete sensing unit assembly attached to the hull 10 of a boat with screws 18, which preferably are shorter than the thickness of the hull, thus minimizing the possibility of a leak. Alternatively, thin through-hull machine screws may be used provided a sealing material is used. A third alternative, avoiding any obstruction of the hull at all, is to attach the assembly with an epoxy type glue. Regardless what alternative is chosen, one of the important features of the invention, minimum penetration of the hull, is retained.

The assembly shown in FIG. 1A consists of a brass bracket 14, approximately 3¼" high, 5¼" long, and 1/16" thick, with a cutout in the middle to accept a ⅞" brass tube 15 with an inner diameter of ¾". The brass tube 15 is soldered to the bracket. The open end, which faces forward (to the left in FIG. 1A), is filled with a plug 16, which is cut into two halves, providing space for the bracket in between the halves. The split plug 16 is also soldered to the bracket and the tube, thus forming one solid bracket assembly. Inside the tube, a stainless steel spring 17 is positioned so that its left end rests against the plug 16. The spring 17 is secured in position through a small hook 17A at its inner end, which protrudes through a small hole in the tube close to the plug. The function of the spring is to keep the bearing assembly 13, shown in greater detail in FIG. 1B, firmly in position after it has been inserted. The bearing assembly 13 has two diagonally located screws 139 with so-called cheeseheads, which engage in cutouts 140, likewise diagonally arranged, at the open end of the tube 15. The cutouts 140 are similar to those in so-called bayonet sockets, e.g. sockets used for automotive incandescent lamps.

The bearing assembly, shown in enlarged section in FIG. 1B, consists of a cylindrical brass body 13 with a slightly smaller outside diameter than the inside of the tube 15. It has an inside bore accommodating a stainless steel shaft 131, approximately 7" long and 3/16" diameter. The shaft is supported at the left end by a small flanged stainless steel ball bearing 132, which acts as thrust bearing against the drag caused by the vaned rotator 11. A small clip-ring 133 engaging a groove on the shaft keeps the left end of the shaft secured against the inner race of the ball bearing. The other end of the shaft is supported by an oil-impregnated bronze bearing 135, which, thanks to precise tolerances, also acts as a seal against entry of water. The bronze bearing is preferably secured in position by a washer 136 and a retainer ring 137. If desired, excessive axial play of the shaft may be avoided by another washer and a clamp ring, though this is not essential. The bearing assembly is sealed by a large screw cap 134, which engages threads in the left open end of the body 13. The two diagonally arranged screws 139 form pins for the "bayonet" locking scheme, as explained above.

The bearing assembly is filled with oil in order to reduce friction and to minimize entry of sea water. With the above-described design, some leakage will still take place at the bronze bearing and as a result the assembly should be refilled with new oil once per season. As all parts are rustproof, the entry of some water is not harmful. The oil and the water form a emulsion, which still provides a lubricating action.

The rotator 11 is attached to the extension of the shaft as appears from FIG. 1A and 1B. A roller pin 19 keeps it in position. For the experimental verification of the invention, a standard "SUMLOG" rotator was purchased. The hole for the shaft was reamed to fit on the 3/16" shaft. Four ceramic ringmagnets, Indiana General type F 1410, available commercially from Indiana General Division of Electronic Memories and Magnetics Corp. 405 Elm St., Valparaiso, Ind. 46383, magnetized across the diameter, were first aligned so that their magnetic fields were pointed in the same direction and then glued together with a fast curing epoxy. The resulting composite ring-magnet 12 with an outer diameter of 0.5 inches, an inner diameter of 0.1875 inches and a length of 0.5 inches was then imbedded in the hub of the rotator with epoxy glue. During the gluing process, an oiled shaft was inserted through the ringmagnet and the rotator in order to ensure proper alignment. The position of the composite ringmagnet 12 inside the hub of the rotator is shown in FIG. 1A and FIG. 1B.

Before proceeding to a description of the means for sensing the motion of the rotator, it should be noted that the mounting of the rotator with its ringmagnet assembly is such that a minimum rotational friction is obtained with the combination of a ballbearing-type thrust bearing and a precision bronze bearing. Any radial forces should also be very small in the preferred implementation. It should also be apparent from the foregoing description that removal of the rotator and its bearing assembly for maintenance or storage is readily accomplished even if the vessel is in the water. On small boats, it may be reached from the side or transom of the boat. On a larger vessel, one may have to dive to reach it, but the removal and reinsertion will only take a few seconds. Accordingly, very simple diving equipment, or none at all, is required.

It should also be noted that the described bearing arrangement could be simplified. To start with, a smaller shaft and bearings would probably be adequate, thus reducing overall size of the assembly and cost. Further, it is likely that the bearings could be completely eliminated with only a small sacrifice in accuracy, namely by letting the rotator itself turn around a polished, stainless steel shaft. The main source of friction would be the rear end of the rotator, which would have to form a thrust bearing against for instance a polished stainless steel washer. The easy removal feature could still be retained, if the fixed shaft were attached to, or molded into, a body, which could engage the bracket 14 in a similar way as described, e.g. by using a bayonet type mount.

The principle for sensing of the rotation of the rotator will now be described with reference to FIG. 1C which shows a cross-section of the hub of the rotator 11 and the imbedded ringmagnet assembly 12. Fluxlines illustrate the magnetic field created by the ringmagnet assembly for one specific rotational position. The field configuration closely resembles the field from a magnetic dipole located on the axis of the rotator. In the position shown, the magnetic moment vector of the dipole is horizontal, pointing to the left. Two magnetometers, 21 and 22, the detailed function of which will be described shortly, are preferably positioned in the plane of the cross-section at equal distances from a vertical plane through the axis of the rotator. The magnetometers, preferably of the flux-gate type, may briefly be described as inductors with saturable cores, having exciting windings for the magnetization of the cores with an AC current, e.g. at a frequency of 400 Hz, and separate sense windings so arranged that the excitation field does not generate an induced voltage. In the presence of an external magnetic field in the preferred direction of the magnetometers, an AC voltage will be induced in the sense winding with a fundamental frequency twice that of the magnetizing (or exciting) current, e.g. 800 Hz, and with a magnitude proportional to the strength of the external field. If the direction of the external field changes direction 180°, the relative phase of the induced voltage undergoes a 180° phase shift. An external field at right angles to the magnetometers does not generate an induced voltage. Accordingly, the sense voltage indicates strength and polarity of the vertical magnetic field to which the magnetometers 21 and 22 are exposed as they are positioned with their preferred directions of sensitivity vertical. The sense windings are however series connected in opposition, so that the resulting output voltage by magnitude and polarity represents the difference between the vertical components of the magnetic fields at the location of the magnetometers. The result of this arrangement is that any disturbing external fields, such as the magnetic field of the earth, which are homogenous and accordingly have approximately equal strengths and directions at both magnetometers will generate equal but opposing voltages in the sense windings of the two magnetometers with zero or very small net output voltage as a result.

The basic theory of magnetometers is well-known in the art. For general background information, reference may be made, for example, to my prior U.S. Pat. No. 3,821,637, granted June 28, 1974 for an "Automatically Compensated Permeameter," assigned to North Electric Company.

Some aspects of the arrangement of the magnetometers for sensing the revolutions of the rotator now warrant some elaboration. The use of magnetometers is essential for the remote sensing of the dipole field from the rotator due to the fact that the field decays very rapidly with distance. Specifically, field strength is inversely proportional to the cube of distance. Fluxgate magnetometers are characterized by high sensitivity and stability and are therefore well suited for this purpose, although other devices may be considered. For example, Hall generators, when fed by an AC current, can also deliver an AC output signal proportional to the magnetic field in terms of amplitude and phase. The absolute values of output signals are, however, much smaller from Hall generators, thus necessitating more amplification, with impaired noise immunity as a result.

In order to utilize the comparatively weak field from the rotator in the presence of disturbing fields, the astatic arrangement of opposing magnetometers according to the invention, as described, is important. The optimum separation between the magnetometers has been theoretically analyzed and confirmed by experiments. Theoretically, the optimum separation between the centerpoints of the magnetometers should be equal to the distance from the center of the magnet assembly to a line connecting the centerpoints of the magnetometers. The symmetrical arrangement shown in FIG. 1C insures optimum performance and maximum discrimination against disturbing fields. Although references to horizontal and vertical have been used in the description for ease of explanation, it should be understood that both the rotator assembly including its support and the magnetometers may be attached to a sloping portion of the hull as long as the relative positions and angles between these three elements are retained.

Each of the fluxgate magnetometers 21 and 22 used in the preferred embodiment consists of five basic parts as shown in FIG. 2A (physical structure) and in FIG. 2B (schematic representation): a core assembly 201 consisting of interleaved U-shaped laminations, primary coils 202 and 203 surrounding the legs of the core assembly, secondary coils 204 and 205 also surrounding the legs of the core. The primary coils each with the same number of turns, are series-connected in such a way that their magnetomotive forces add in generating magnetic fluxlines which follow a closed path through the two legs and the end sections of the core assembly. This path has very low reluctance at low magnetization levels, thanks to the overlap between the ends of the legs and the bottom section of the U which has twice the width of the legs, assuming use of a high permeability material, preferably with a square hysteresis loop, facilitating saturation. The primary windings are used to magnetize the core with an AC current e.g. at 400 Hz, of such shape and strength that the core saturates twice during each cycle. The secondary windings 204, 205, each also having the same number of turns, (although normally different from the number of turns on the primary windings) are series-connected in such a way that they oppose each other with regard to flux circulating through the closed magnetic field core structure. As a result, the voltages induced in the secondary windings by the magnetizing flux (also referred to as "excitation flux") will cancel, with zero output voltage as a result, in absence of any superimposed "DC" field. In this context, "DC" means a static or slowly-varying field as compared to field variations due to the relatively high-frequency magnetizing current.

If an external "DC" field is present with a component in the same direction at the two legs of the magnetometers and if the core is not saturated, a concentration of corresponding fluxlines in the core legs will take place due to the high permeability of the core material. It should be noted that this concentration of flux caused by an external field will have the same strength and direction in both legs of the core, as distinguished from the excitation flux upon which it is superimposed. The excitation flux has the same strength but opposite directions in the two legs. If the magnetizing current is increased to such a value that the core saturates for portions of each cycle, its relative permeability is concurrently reduced and the above-mentioned flux concentration caused by the external field is reduced during the saturation periods. In the extreme case of very high saturation, one might visualize that the fluxlines caused by the external field become straight as if the core were nonmagnetic. When the exciting current has passed its peak and is sufficiently reduced, the "DC flux" concentration through the legs will resume. The net result is that the portion of the flux caused by an external DC field, which passes through the core legs, is modulated by the excitation field and a corresponding AC voltage is induced in the secondary windings with such polarity that the voltages from the two windings add to each other.

In an alternative arrangement, the secondary windings, with little change in function, may be replaced with one secondary winding enclosing both legs of the core structure. It is now easier to recognize how the external flux through this sensing coil is modulated (or gated) by the magnetization of the core with an amplitude sufficiently high to saturate the core. Assuming a symmetrical excitation current, which is essential for proper operation, it is obvious that the sensed signal will have twice the frequency as two output impulses are generated per primary cycle, one for each moment of saturation, independent of the polarity of the saturating field.

The output impulses induced due to the brief reduction in flux density are bipolar in nature and their shape and duration are less than ideal for detection purposes. A more useful signal can be obtained by filtering. A simple and effective way to accomplish filtering is to connect a capacitor across the sense winding of such a value that the resulting parallel LC circuit becomes tuned for the fundamental component in the sensed signal, i.e. a frequency twice that of the magnetizing current. With two series-connected magnetometers as described, still only one common tuning capacitor is required. If desired, the selectivity, and also the size of output signal developed across the tuning capacitor might be further increased by connecting an auxiliary low-loss inductor in series with the sense windings and the tuning capacitor. In the illustrated embodiment, both selectivity and sensitivity were adequate without such an auxiliary inductor.

Again looking at the dipole field generated by the rotator magnets as illustrated in FIG. 1C, it will be observed that the fluxlines, although they may be at a slight angle from vertical, cross the magnetometers in opposite directions, thus generating induced voltages which add rather than subtract and thus result in a useful output signal from the magnetometers. The amplitude of the output signal is maximum when the dipole moment vector is horizontal as indicated in FIG. 1C. As the rotator turns, e.g. clockwise from the indicated position, the net AC signal amplitude will diminish and pass through zero at 90° rotation, then gradually increase in amplitude to reach another maximum but with opposite phase after 180° rotation (the magnetic moment pointing to the right), then decrease to a zero at 270° and will finally return to the original magnitude and phase after one complete turn. With proper circuit arrangements as described, the voltage across the tuning capacitor will approach a sinewave as a function of time when the rotator is in a fixed position, such as shown in FIG. 1C. The amplitude and phase will also, as described, vary sinusoidally with the rotation of the magnet assembly (including the rotator). The resulting output voltage $v_r$ may accordingly be described mathematically as follows:

$$v_r = V_o \cos(\omega t + \phi) \cos \theta$$

where $V_o$ is the absolute value of the maximum amplitude of the signal $v_r$, $\omega$ is the angular frequency, e.g. $2\pi \times 800$, t is time, $\phi$ is reference phase and $\theta$ is the angle of rotation of the rotator. With access to the reference phase, which is directly related to the phase of the magnetizing current, the output signal $v_r$ can be demodulated and a quasistationary demodulated signal $v_d$ obtained which directly reflects the rotation $\theta$.

If, for instance, $v_r$ is multiplied with a reference signal $v_{ref}$ having the same frequency and phase i.e.

$$v_{ref} = V_d \cos(\omega t + \phi),$$

we obtain the demodulated signal $$v_{de} = V_o V_d \cos^2(\omega t + \phi) \cos \theta$$

This expression transforms into:

$$v_{de} = \tfrac{1}{2} V_o V_d [1 + \cos 2(\omega t + \phi)] \cdot \cos \theta$$

The components of frequency $2\omega$ can easily be removed by filtering and the filtered signal $v_f$ takes the form $$v_f = \tfrac{1}{2} V_o V_d \cos \theta$$

It has accordingly been demonstrated how the resulting voltage $v_r$ from the series-connected magnetometers, through simple signal processing steps well established in the art, can be converted into a demodulated and filtered signal $v_f$ which by its number of electrical cycles directly represents the number of turns of the rotator, i.e. the distance traveled through the water, taking into account the pitch of the rotator. It should again be observed that the amplitude of $v_f$ is independent of speed. It is therefore a simple matter to apply $v_f$ to a suitable electrical counter, which will record the distance traveled in terms of the number of revolutions of the rotator. Similarly, by applying the signal $v_f$ to an electronic tachometer circuit with a suitable scale-factor, a direct reading indication of the speed of the vessel can easily be obtained.

One feature of the invention now to be described is improved and highly efficient pulse-shaping circuitry for the generation of a magnetizing current with a suitable waveform. In order to obtain a useful output signal from the magnetometers, a rather high saturation current is needed. If one tries to generate such a magnetization current with an oscillator followed by a conventional amplifier, the total efficiency becomes rather low. As low battery drain is desirable for a ship's log, to be used for instance on sailboats, an important feature of the invention is a specific circuit arrangement providing excellent magnetometer sensitivity with very low drive power. Advantage is taken of so-called ferroresonance, a well-known technique using saturable transformers in combination with capacitors to obtain AC voltage regulation. The same circuit configuration is useful in this application to generate the high magnetization (excitation) current peaks needed for the magnetometer operator.

As shown in FIG. 2C, the magnetization windings 202, 203 and 202', 203' of the two magnetometers 21 and 22 are connected in series with a capacitor 206, which is fed by a voltage $v_d$ in series with an inductor 207. The drive (or feed) current is designated $i_d$ and the magnetization current for the magnetometers is designated $i_m$. Each pair of secondary windings 204, 205 and 204', 205' is connected in series in an opposing sense, as described before, and the combination is parallelled by a capacitor 208 chosen to resonate with the sense windings at a frequency twice that of the drive voltage $v_d$.

The number of turns on each pair of primary windings 202, 203 and 202', 203' is so chosen, based on the core material and cross-section, that saturation is obtained at a somewhat lower voltage than the available drive voltage $v_d$. The capacitor 206 should be as large as practical, as the output voltage increases with the capacitance. The drive power also increases, however, and risk of instability as well. It has been observed that under certain conditions, magnetometers may "self-oscillate," i.e. deliver an output signal in the absence of stimulating external field.

In the illustrative implementation of the invention, the magnetometers consist of cores of Permalloy 80 laminations size DU-18, 6 mils. thick, obtainable from Magnetics, Inc., Butler, Pennsylvania. The cross-section is 9/128" square inches per leg and the drive (primary) windings have 30 turns/leg, 26 gauge wire. The secondary windings, enclosing both legs, consist of 2200 turns of 36 gauge wire. The nominal saturation flux density of the material is 0.7 T, corresponding to a mean value of the applied AC voltage of approximately 6 V at 400 Hz. This agrees well with the actual operation with $v_d \approx 6.7$ V for optimum operation (minimum drive power). The value of the resonating primary capacitor 206 was chosen as 5 µF, a value which is not critical. Lower values give a correspondingly lower sensitivity, however. The series inductor 207 should be chosen to resonate with the capacitor 206 at a frequency somewhat lower than the operating frequency. In one test installation, satisfactory operation was achieved in the range of 0.05 to 0.09 Henry, corresponding to a resonant frequency of 0.8 to 0.6 of the operating frequency. 0.05 H is to be preferred, as it requires lower starting voltage, that is, the voltage at which the circuit changes from linear to ferroresonant operation. Obviously, the starting voltage should lie well below the operating drive voltage to ensure that the circuit goes into ferroresonance when starting. A lower inductance than 0.045 H tended to give unstable operation.

The operation of the system will now be described with reference to the waveforms A-F in FIG. 2D. Certain exemplary voltage and current values are indicated on the vertical coordinates of these waveforms, as actually used in one test installation; but these are, of course, not limiting and may vary depending on the specific circuit parameters. The drive voltage $v_d$ can be a sine wave, but a square-wave drive signal with the same mean value, as shown by waveform A, gives approximately the same result thanks to the filtering action of the inductor 207. This has the added advantage of higher efficiency in the driving amplifier. Accordingly, a square wave drive voltage of approximately 13.2 $V_{p-p}$ at 400 Hz was preferred in the illustrative embodiment. If the drive voltage $v_d$ is gradually increased from zero, the voltage $v_c$ across the capacitor 206 also increases, being almost sinusoidal and approximately 180° out of phase from $v_d$. At the same time, the drive current $i_d$, as shown by waveform B, of course lags $v_d$ by approximately 90° and will eventually obtain a rather high value: approx. 150 mA$_{p-p}$ At a value of approx. 6 $V_{p-p}$ for $v_d$, the circuit flips into ferroresonance and the capacitor voltage $v_c$, approaches a square waveform somewhat lagging $v_d$. This is illustrated by the waveform C in FIG. 2D. At the illustrated operating point $v_c$, as shown, waveform C is almost square, only lagging $v_d$ by 0.1 ms. (The total cycle time is 2.5 ms at 400 Hz). At the same time, the drive current is minimized, also assuming a flattened shape as shown with an amplitude of less than 20 mA. As a result, the drive power is only of the order of 100 mW.

During the time $v_c$ is almost constant, the flux in the cores changes at a rate proportional to the applied voltage $v_c/2$, only taking a very small magnetizing current thanks to the low coercive force (high permeability) required to energize the cores.

When the flux density eventually approaches saturation, the magnetizing current increases rapidly and reaches a peak of approximately 1.7A for a short duration, as shown by waveform D in FIG. 2D. During this time, the capacitor 207 is discharged and recharged by resonant action to an almost equal voltage of opposite polarity. Thus energy is conserved and the drive power only serves to replace the energy lost due to copper and core losses.

The waveform E in FIG. 2D shows the sensed voltage $v_s$ developed across the tuning capacitor 207 for a certain external field of the same magnitude as generated by the rotator in the position shown in FIG. 1C, that is for maximum amplitude signal. Waveform F also shows the sensed voltage $v_s'$ corresponding to a 180° rotation of the rotator. It will be observed that the waveform in either case is a damped sine wave reinforced once during each cycle by a steep increase in amplitude coincident with the peaks of the magnetizing current $i_m$. In the described implementation, the tuning capacitor 207 has a value of approx. 0.07 µF. The Q of the resonant circuit formed by this capacitor and the two sense windings is approx. 6, corresponding to a series resistance of approx. 240Ω per magnetometer. The winding resistance is 200Ω, the balance in equivalent series resistance due to core losses.

In addition to the savings in power, the ferroresonant circuit has another important advantage: the output signal $v_s$ varies only to a small degree with the drive level. As an example, in a test installation the amplitude of $V_s$ changed only by about 3% for a 25% change in drive level, in the range of 12.6-16.2 $V_{p-p}$. A reduction to 9 $V_{p-p}$ caused a decrease of only 10% in output.

Consequently, the drive voltage may be derived from a battery source without any substantial change in performance during the discharge cycle. It will also work well during charging.

Whereas a fundamental method for demodulation, i.e., detection of the signal which directly corresponds to the rotation of the rotator already has been described, another feature of the invention is the provision of a very simple and efficient circuit for detection of the rotation of the permanent magnets on the shaft of the sensing unit of FIG. 1A. Simplified circuitry for detection of the signal $v_f$, representing the rotation of the rotator, will now be described with reference to the circuit diagram in FIG. 3A which also shows how the drive voltage $v_d$ for the magnetometers is generated. It further shows the counter circuits by which the $v_f$ signal is converted into suitable readout to indicate travelled distance and also into a direct indication of speed. In explaining the operation of the circuitry of FIG. 3A, reference will also be made to various waveforms represented by the timing diagram of FIG. 3B.

In order to obtain optimum operation of the magnetometers, it has been found important to provide a symmetrical drive voltage $v_d$, i.e. a drive voltage that has a minimum of even harmonics. As shown in waveform A in FIG. 2D, drive voltage $v_d$ is preferably a square wave with the positive half cycle of the same duration as the negative half cycle. A convenient method to attain this objective is to start with an oscillator operating at a frequency at least twice the operating frequency and to derive the drive voltage through one or more frequency dividing circuits. By this method, a phase-stable voltage reference of twice the operating frequency is also automatically obtained for the detection of the sensed voltage $v_s$.

Accordingly, in the illustrated embodiment using an operating frequency of 400 Hz, an oscillator 301 with a frequency of 800 Hz is provided. The choice of operating frequency is not critical. Too high a frequency will create unnecessarily high core losses and will consequently require more power. Too low a frequency may cause resolution problems, especially if the frequency of rotation is high.

Figure 3A:
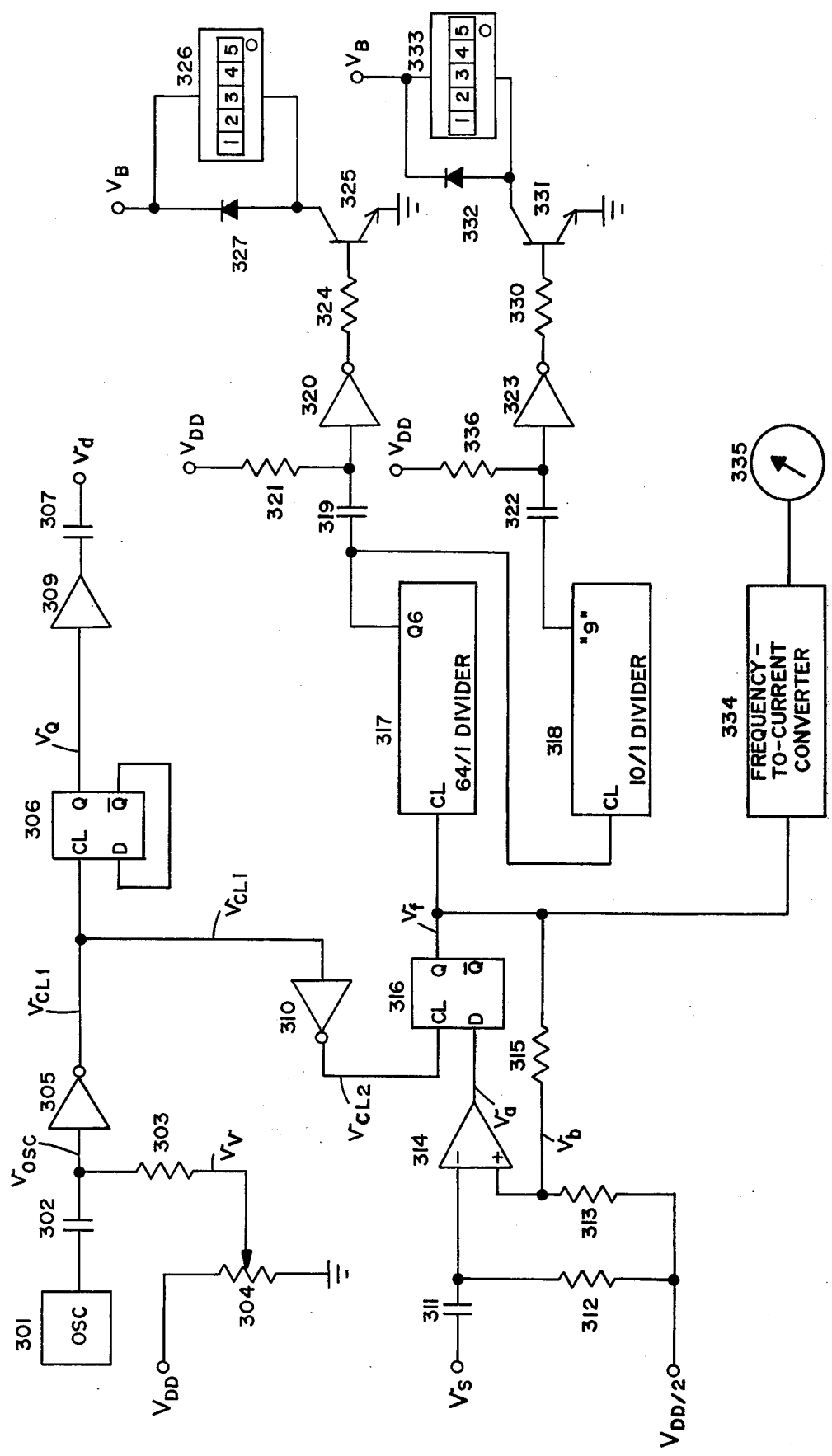
FIG. 3A is a circuit diagram in simplified one-line form of signal-processing and indicating elements of the system.

The oscillator 301 in FIG. 3A can be of any conventional design. For example, an RC oscillator with an output signal of 6–8 $V_{p-p}$ is adequate in conjunction with the rest of the circuitry which in the implemented embodiment used a +9 V regulated source. This, in turn, was derived from a 12 V battery. The 9 V source was used for all integrated circuits, which, with the exception of an operational amplifier 314 and a frequency-to-current converter 334, were of the CMOS type. This type was preferred for its low current drain.

Figure 3B:
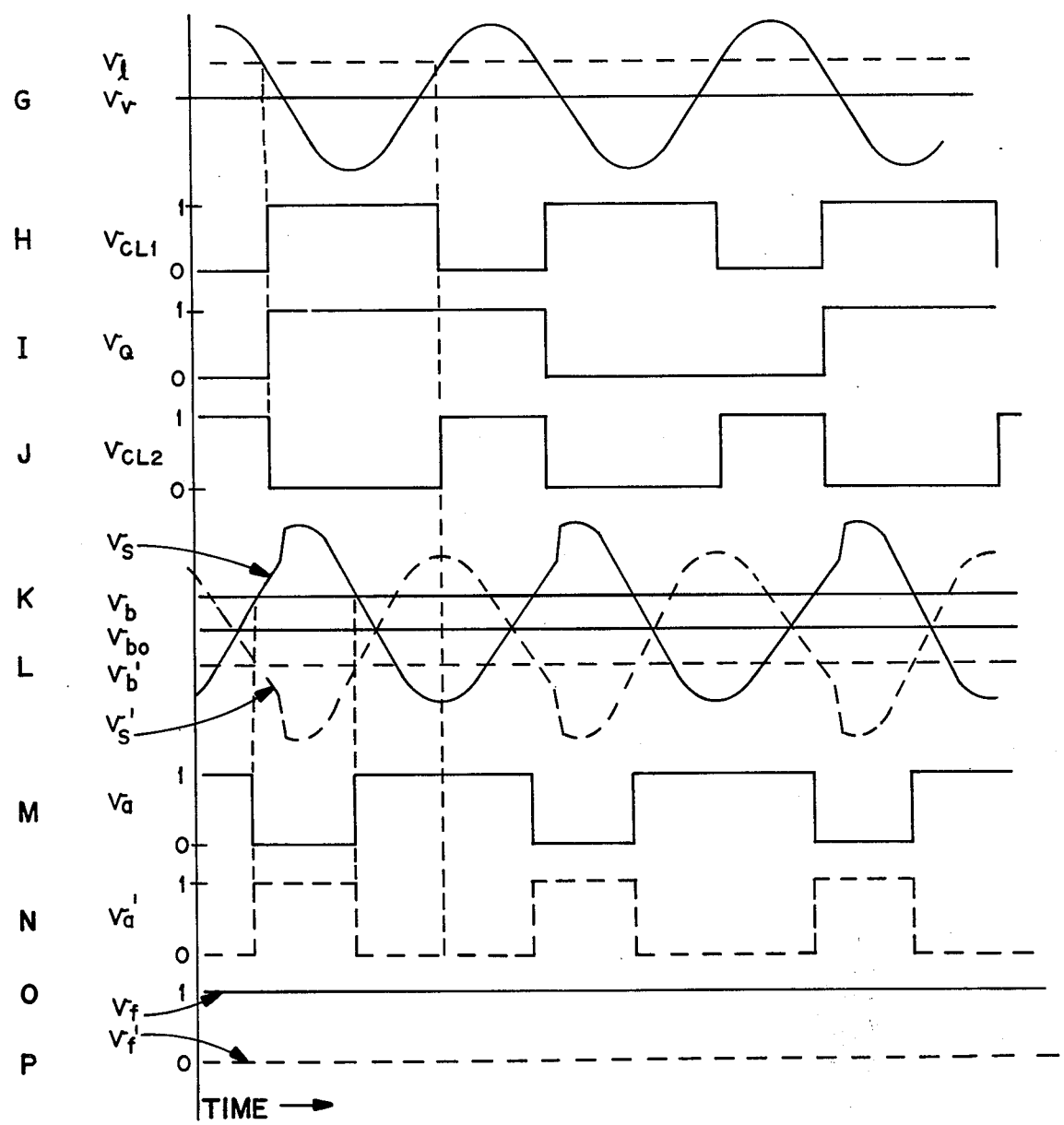
FIG. 3B is another set of waveforms showing how certain voltages and currents in the signal-processing and indicating system of FIG. 3A vary with time.

The sine wave signal $v_{osc}$ depicted by the waveform G in the timing diagram of FIG. 3B, is fed from oscillator 301 via a capacitor 302 to an inverter circuit 305. Circuit 305 which may be part of an integrated circuit, RCA type CD 4049, generates corresponding square clock pulse train $v_{CL1}$ represented by waveform H in FIG. 3B. A variable DC bias voltage $V_v$, obtained from a potentiometer 304, is superimposed, via a resistor 303, on the input AC signal to the inverter. By adjusting $V_v$ in relation to the threshold level $V_1$ of the inverter, the pulse width may be set to any desired value. Thereby the leading edge of clock pulse $v_{CL2}$, which is instrumental in the detection process, may be set for optimum phase relation to the drive voltage $v_d$ and consequently also in relation to the sense voltage $v_s$ from the magnetometers. The clock pulses $v_{CL1}$ are fed to a type D flip-flop 306 which acts as a frequency divider thanks to the feedback from the $\bar{Q}$ output to the D input. This flip-flop may, as also flip-flop 316, be part of an RCA integrated circuit type CD 4013. The resulting waveform $v_Q$ is shown by waveform I in FIG. 3B in proper phase relationship.

The square wave $v_Q$ in the example of frequency 400 Hz is fed to amplifier 309 which delivers the drive voltage $v_d$ to the magnetometer circuit, earlier described. A series capacitor 307 serves to remove any DC component from the drive voltage $v_d$.

The principle for detection of the rotation signal $v_f$, according to a feature of the invention, relies on determining the polarity of the sense signal $v_s$ at a time of reference at which the absolute value of the amplitude has a maximum. The $v_s$ signal, represented by waveform K in FIG. 3B, is indicative of a position of the rotator providing a maximum output signal. It has two recurring absolute maximums: a positive peak which includes a steep rise due to the fluxgate action, followed by a smoother negative peak that is part of the damped sine wave oscillation resulting from the tuning of the sense windings by capacitor 207 in FIG. 2C. Either absolute maximum may be used to control the output. In the illustrated embodiment, the smooth negative maximum has been selected.

The polarity detection in its turn relies on the use of a D flip-flop 316 which at its Q output will retain the low or high state of the signal applied to the D input at the rising edge of a clock pulse applied to its clock input. The clock pulse must, of course, have twice the magnetometer operating frequency and can accordingly be derived from the $v_{CL1}$ clock pulses (waveform H) used to generate the drive signal. This is simply done by inversion in an inverter 310 connected between the Q output of the D flip-flop 306 and the clock input of D flip-flop 316. As can be seen from the waveform J in the timing diagram in FIG. 3B, this secondary clock pulse $v_{CL2}$ has its rising edge coinciding with the falling edge of $v_{CL1}$. The exact position of $v_{CL2}$ with reference to the rising edge of $v_{CL1}$, which determines the phase of the drive signal $v_d$, can therefore be adjusted for optimum operation by adjustment of the pulse width of $v_{CL1}$, using the potentiometer 304.

The sense signal $v_s$ from the magnetometers (represented by waveform K in FIG. 3B) is applied via a capacitor 311 to the inverting input of the operational amplifier 314 which, due to the absence of negative feedback, acts as a limiting amplifier even for low differential input signals. Both the inverting and the non-inverting inputs of the amplifier, which may be of the 741 type, obtain bias from a source $v_{bo}$ having a value preferably equal to half the regulated supply voltage, e.g. 4.5 V, through two resistors 312 and 313 which may be of the same magnitude. In addition, a small portion of the voltage at the Q output is fed back to the non-inverting input via a resistor 315 which should be much larger in resistance than resistor 313. In the actual embodiment, a factor of 82 was found satisfactory. Depending on the logic output of flip-flop 316, the bias voltage at the non-inverting input of the operational amplifier 314 will assume either of two values, $v_b$ or $v_b'$, slightly higher or lower respectively than the bias $v_{bo}$ at the inverting input. As shown by waveform M in FIG. 3B, the output voltage $v_a$ from the limiting amplifier will change from maximum to minimum when the total voltage (bias +AC signal) at the inverting input passes the voltage at the non-inverting input in a positive-going direction and vice versa. For the $v_s$ signal depicted in FIG. 3B, a bias at the non-inverting input $v_b$ has been assumed and the resulting output voltage $v_o$ has the waveform represented at M in FIG. 3B. Accordingly, a "high" voltage (logic 1) is present at the D input of flip-flop 316 at which time it is clocked by the rising edge of $v_{CL2}$. As a result, the Q output $v_f$ stays consistently "high." Accordingly, the assumption of the higher bias $v_b$ being present at the non-inverting input was correct.

Let us now assume that the rotator slowly turns. As a result, the wave $v_s$, having the waveshape depicted at K in FIG. 3B, slowly shrinks in amplitude and the crossover points between $v_s$ and $v_b$ will move closer together, broadening the positive pulses in the $v_a$ wavetrain until $v_a$ eventually assumes a steady high value at a time when the positive peak of $v_s$ no longer exceeds $v_b$. Accordingly, the output of flip-flop 316 still stays high and remains so while a signal of reverse polarity, designated as $v_s'$ (represented by the dashed waveform L in the timing diagram of FIG. 3B) begins to build up. First, when the flat positive maximum of $v_s'$ exceeds $v_b$, the amplifier output voltage $v_a$ (waveform M in FIG. 3B) will momentarily go "low" for a very brief moment coinciding with the rising edge of $v_{CL2}$, the phase of which has been adjusted with this situation in mind. The result of a low voltage at the D input of the flip-flop when the clock input goes high, is that the Q output voltage $v_f$ (waveform O in FIG. 3B) instantaneously goes low, providing voltage $v_f'$ (waveform P in FIG. 3B). Consequently, the bias at the non-inverting input changes from $v_b$ to $v_b'$. Thanks to this feed-back, which is positive in nature, the instantaneous voltage $v_s'$ at the inverting input now exceeds the new bias $v_b'$ by a good margin, maintaining the amplifier output voltage $v_a'$ low, as indicated by waveform N in FIG. 3B.

As $v_s'$ grows, the "low" portion of voltage $v_a'$ will broaden and the flip-flop will remain set low. When $v_s'$, as shown by waveform L, is again reduced in amplitude due to further rotation of the shaft, the output voltage $v_f'$ will still remain low for the same reason as was explained above with reference to $v_s$ and $v_f$. First when $v_s'$ has reached zero and a voltage $v_s$ has built up to such a level that its negative maximum exceeds the bias $v_b'$ will $v_f'$ change into the high $v_f$ level and the bias will instantaneously return to $v_b'$, thus stabilizing the $v_f$ level through the positive feed-back action.

The above description of the operation of the phase detector circuit started with an assumed magnetometer output signal $v_s$ substantially exceeding the threshold level $v_b'$ corresponding to a rotator position as depicted in FIG. 1C providing a maximum amplitude of the $v_s$ signal. This angular position represents 90° rotation from an assumed reference position of minimum field strength at the magnetometers. It should be apparent from the foregoing that the phase of the high-frequency cyclic output signal $v_s$ has one value for a first range of angular positions of the shaft lying within 0° and 180° and a reversed phase for a second range of positions lying within 180° and 360°. The detector output signal $v_f$ as described has only two distinct values, high and low, which reflect the two mentioned phase ranges with a slight lag caused by the feedback mechanism.

The above-described phase detection circuit constitutes a valuable feature of the invention as, with a minimum of circuitry, a well-defined digital output signal is obtained, which completes one full cycle for each turn of the rotator. The feedback via resistor 315 was found essential in the test version of the circuit, as in its absence any small superimposed noise signal would generate multiple triggering of the flip-flop 316, with invalid counts as a result.

The rest of the circuitry shown in FIG. 3A is conventional and can be implemented in many ways according to the state of the art. The arrangement shown only serves to illustrate how the complete log and speedometer system may be implemented. For example, in order to obtain a registration on a trip meter with a resolution of 100ths of nautical miles, a drive pulse for an electrical counter 326 is required for a number of turns of the rotator which corresponds to this distance. This number was found to be 64 for the particular rotator used in the implemented embodiment. Accordingly, a six-bit binary counter would suffice to generate an output pulse for every 64 pulses in $v_f$. Consequently, a standard integrated circuit binary counter such as RCA type CD 4024 may be used in the divider circuit 317, provided the output is derived from Q6 in the sixth stage, as the CD 4024 counter has seven stages. The output signal from Q6 is connected to an inverter 320 via a capacitor 319. A bias resistor 321 is connected between the positive supply voltage $v_{DD}$ and the input to the inverter. As a result, the input of the inverter is normally high and consequently its output is low. A trailing edge of a pulse from the counter 317 will, however, force the input low, thus generating a positive output pulse from the inverter, the length of which is determined by the time constant of the resistor-capacitor combination and the threshold voltage of the inverter, provided of course that the output of counter 317 stays low for a longer time than the length of the desired output pulse of the inverter 320. In practice, this is the case with considerable margin (a factor of 10 or more for speeds under 40 knots). The capacitor 319 is automatically recharged when the output of counter 317 goes high through a built-in protection diode (not shown) at the input of inverter 320.

The time constant of resistor 321 and capacitor 319 in combination should be adjusted so that a drive pulse of approximately 100 ms length is generated, suitable to operate the electromechanical counter 326 by a transistor 325, fed from the inverter via a resistor 324. A diode 327 protects the transistor from inductively generated overvoltage during turn-off.

The high resolution of 100 ths of nautical miles is suitable for a trip meter which may be mechanically reset and the electromechanical counter 326 may accordingly have such a provision. It is usually desirable also to provide an accumulating counter with less resolution, e.g. 10ths of nautical miles. For this purpose, another electromechanical counter 333 is provided. It is operated in a manner similar to that described above, using a pulse shaping circuit arrangement comprising a capacitor 322, a resistor 336, an inverter 323, a resistor 330, a transistor 331, and a diode 332. The pulse-shaping circuitry is preceded by another counter 318 which divides the output pulses from counter 317 by a factor of 10. The RCA-type CD 4017 counter is well-suited for this purpose using the "9" output terminal to feed capacitor 322 of the pulse shaping network.

In order to obtain a direct indication of speed, a conventional tachometer circuit 334 may be used which converts the frequency of the squarewave signal $v_f$ available at either output of D flip-flop 316, into a proportional DC voltage, or even better, into a DC current which can be indicated by a voltmeter or millimeter 335. The meter may of course be calibrated in knots, or alternatively, in miles per hour if this unit is preferred.

A suitable frequency-to-voltage converter circuit using integrated circuit is the Type LM 2917 shown on page 9–72 of the "Linear Data Book" issued in 1976 by National Semiconductor Corp., Santa Clara, Calif. In the tested embodiment of the invention, this circuit was modified into a frequency-to-current converter by inserting the indicating millimeter in the collector lead to the + voltage source of the output transistor in LM 2917 and also by reducing the emitter series resistor to ground to a suitable value for the meter used.

Whereas for illustrative purposes one specific circuit arrangement for registration of distance and speed has been described, many variations on such circuitry will be obvious to one skilled in the art in order to implement the invention and to provide specific features. For instance, without losing one of the important advantages of the ship's log according to the invention, i.e. its constancy of calibration, the fixed divider 317 may, with some sacrifice of circuit simplicity, be replaced by any one of many known programmable divider circuits. This will enable the user to choose his preferred units of distance, logging either nautical or statute miles, by a simple selector switch or strapping option. By the same means, the user may also compensate for any deviation from the nominal calibration related to the pitch of the rotator caused by the shape of the hull and/or the position of the rotator assembly on the hull.

Further, whereas electromechanical registers have been included in the illustrative embodiment, it should be obvious that the log system according to the invention lends itself to any suitable form of display including electronic displays as used in modern digital instrumentation. Suitable control circuits for such displays are well known in the art.

The tachometer circuit can be modified with a switch and a manually variable bias option to provide an expanded scale indication. This may be a desirable feature for precision trimming of sails on a sailboat or of trimtabs on a powerboat.

Further, while I have described my invention in reference to a particular type of ship's log and speedometer, and have referred to certain exemplary circuit values and waveforms applicable to a particular test embodiment, I wish it to be understood that my invention may have other applications to precision instruments for measuring the rotation of a shaft that is magnetically coupled to a sensor, wherein the instrument sensitivity is unaffected by the rate of rotation of the shaft. I therefore intend my invention to be limited only by the scope and spirit of the appended claims.

I claim:

1. Non-contacting apparatus for measuring the revolutions of a rotating shaft comprising:
    bearing means supporting said shaft for rotation about its axis; a permanent magnet mounted on said shaft with an axis of magnetization oriented substantially transversely with respect to the axis of said shaft; electro-magnetic sensing means comprising a balanced magnetometer assembly physically spaced from said magnet and adapted to generate a cyclic electrical output signal whose amplitude and polarity are functions solely of the angular position of said magnet; and means responsive to said output signal for counting and indicating said revolutions.

2. Apparatus as defined in claim 1, wherein:
    said sensing means comprises an astatic pair of magnetometers and an energizing source of alternating current therefor, said magnetometers being interconnected to maximize said cyclic output signal due to rotation of the field produced by said magnet and to minimize effects of extraneous magnetic fields.

3. Apparatus as defined in claim 1, further including tachometer means for measuring and indicating the rate of cyclic variations in said output signal and thereby the rate of rotation of said shaft.

4. Apparatus as defined in claim 2, wherein:
    said magnetometers are of the flux-gate type and said energizing source provides magnetizing current therefor at a relatively high frequency; wherein:
    said cyclic output signal has a phase determined by the polarity of the incident magnetic field from said permanent magnet; and wherein:
    said means responsive to said output signal is a phase detection circuit.

5. Apparatus as defined in claim 2, further characterized in that said source and said magnetometers are interconnected in a ferroresonant circuit, thereby to reduce the electrical power required to provide said magnetizing current to said magnetometers and to stabilize said cyclic output signal.

6. Apparatus as defined in claim 2, wherein:
    said magnetometers are energized from a relatively high frequency source and whose cyclic output signal is a high-frequency signal having a given phase for a first range of angular positions of said shaft lying within 0° and 180° and a reversed phase for a second range of positions lying within 180° and 360°, as measured from a position of minimum field strength at said magnetometers due to said permanent magnet field; and wherein:
    said means responsive to said cyclic output signal detects phase reversals in said output signal.

7. A ship's log for measuring the distance traveled by a vessel through water comprising:
    a rotator assembly adapted to be mounted outside the hull of a vessel and below its water line, said assembly comprising a shaft, low-friction bearing means supporting said shaft, a vaned rotator for turning said shaft in response to movement through the water, and a permanent magnet affixed to said shaft with its axis of magnetization oriented in a plane substantially at right angles to said shaft;
    a balanced pair of magnetometers adapted to be mounted inside the hull of said vessel substantially in said plane and substantially equidistant from said shaft, said magnetometers being in sufficiently close proximity to said magnet to respond to its magnetic field;
    electrical circuit means for providing energizing current to said magnetometers and interconnecting them so that their output signals due to said field are added electrically; said magnetometers and circuit means generating a resultant electrical signal that has cyclic variations which are a direct function of the rotation of said magnet; phase detection means energized by said circuit means for detecting phase reversals in said signal due to said rotation;
    digital means for counting and displaying the number of phase reversals with the proper scaling factor, as determined by the pitch of said vaned rotator, thereby to represent the nautical distance travelled by said vessel through the water.

8. A ship's log as defined in claim 7 wherein:
    said magnetometers are of the flux-gate type; and
    said circuit means comprises a source of relatively high-frequency signals for providing magnetizing current to said magnetometers.

9. A ship's log as defined in claim 8, further characterized in that said source and said magnetometers are interconnected in a ferroresonant circuit, thereby to reduce the electrical power required to provide said magnetizing current to said magnetometers and to stabilize said resultant electrical signal.

10. A ship's log as defined in claim 7, further including tachometer means responsive to the rate of cyclic variations in said resultant signal for directly indicating the speed of the vessel through the water.

11. An electrical ship's log for indicating the distance travelled by a marine vessel comprising:
- a rotator assembly adapted to be mounted outside the hull of a vessel and below its water line, said assembly comprising a vaned rotator affixed to a shaft, low-friction bearings supporting said shaft for free rotation as said rotator turns due to ship's movement through the water, at least one of said bearings being a low-friction thrust bearing, and an annular ring-magnet affixed to said shaft, said ring-magnet being permanently magnetized in a plane substantially at right angles to the axis of said shaft;
- a serially-connected pair of substantially identical flux-gate magnetometers adapted to be mounted inside the hull of said vessel parallel to each other, said magnetometers being mounted in said plane and symmetrically spaced from said shaft so as to be magnetically coupled to said ring magnet, each of said magnetometers having a pair of additively-connected excitation windings and a differently-connected pair of sense windings mounted on a closed-circuit ferro-magnetic core structure;
- power supply means providing magnetizing currents to said excitation windings, said power supply means comprising a source of voltage of relatively high frequency and symmetrical waveform, said voltage having sufficient amplitude normally to saturate said cores;
- phase detection means responsive to signals from said sense windings for generating alternating level transitions each time the net difference in magnetic field strength at the magnetometers caused by said ring magnet changes polarity and exceeds a selected threshold value; circuit means comprising a digital counter for converting said level transitions into resultant pulses corresponding to the number of turns made by said rotator, shaft and magnet in traversing a unit distance; and a register augmented by said resultant pulses for logging said displaying the total distance travelled.

12. An electrical ship's log as defined in claim 11, further comprising a frequency-to-voltage conversion means for generating a voltage proportional to rate of said level transitions; and speed indicating means responsive to said voltage for displaying the vessel's speed through the water.

13. An electrical ship's log as defined in claim 11, further characterized in that said power supply means and said pair of magnetometers are interconnected in a ferroresonant circuit thereby to reduce the electrical power drain on said power supply source and to stabilize said signals from said sense winding.

14. Non-contacting apparatus for measuring the number of revolutions made by a rotating shaft comprising:
- a magnet assembly carried by said shaft having an axis of magnetization in a transverse plane intersecting said shaft, an astatically-balanced pair of magnetometers physically spaced from said shaft and symmetrically oriented to respond to magnetic flux from said magnet assembly, said magnetometers having interconnected excitation windings and interconnected sense windings; a source of AC input signals for energizing said excitation windings;
- means for deriving AC reference phase signals from said AC input signal;
- and output means for detecting and indicating cyclically-varying AC output signals from said sense windings; said output signals having amplitude and phase relations with respect to said reference phase signals which are functions of the angular position of said magnet assembly.

15. Apparatus as defined in claim 14 characterized in that said output means includes a phase detection circuit for determining the relative phase of the AC reference and output signals, said phase detection circuit comprising a type "D" flip-flop, an operational amplifier having a pair of inputs and an output, said output being connected to the "D" of said flip-flop, means for impressing said output signals from said sense windings upon one input of said amplifier; means for impressing said reference signals upon the clock input of said flip-flop;
- means for impressing a bias voltage on at least one input of said operational amplifier; and feedback means connected between one input of said operational amplifier and that one of the complementary outputs of said flip-flop which will provide positive feedback through the loop formed by said feedback means, said operational amplifier, and said flip-flop.

* * * * *